_United States Patent Office_

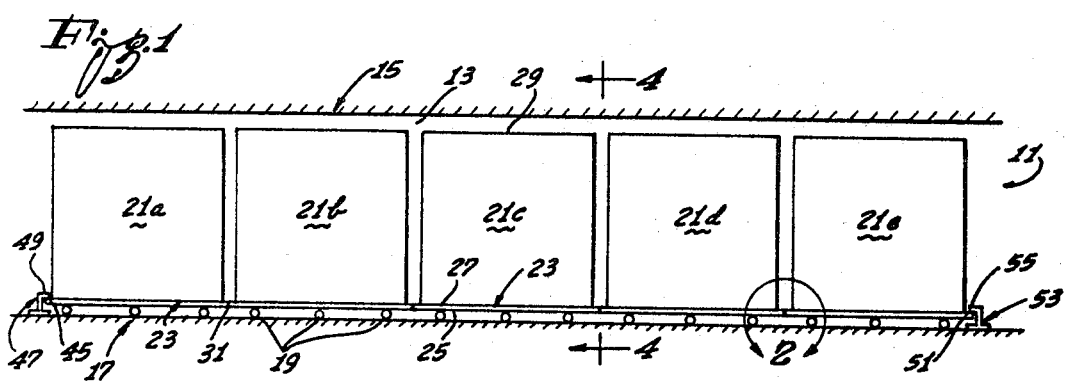
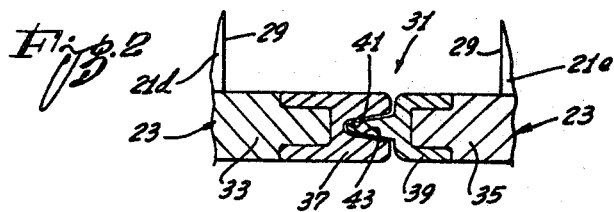
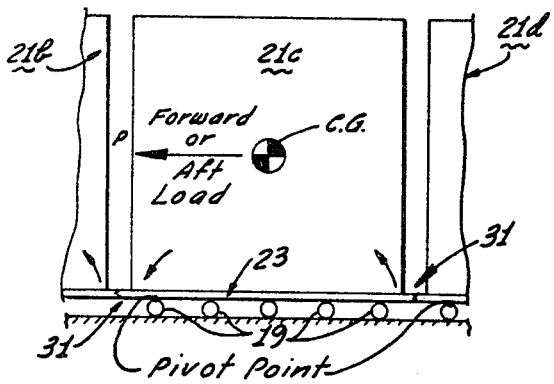
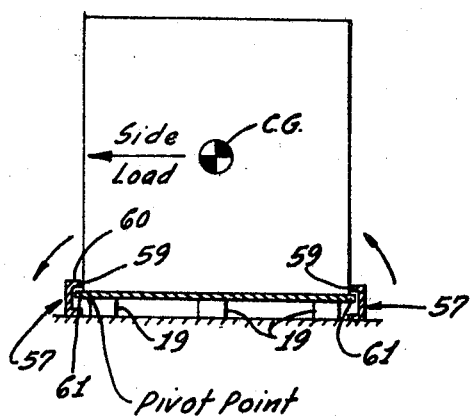

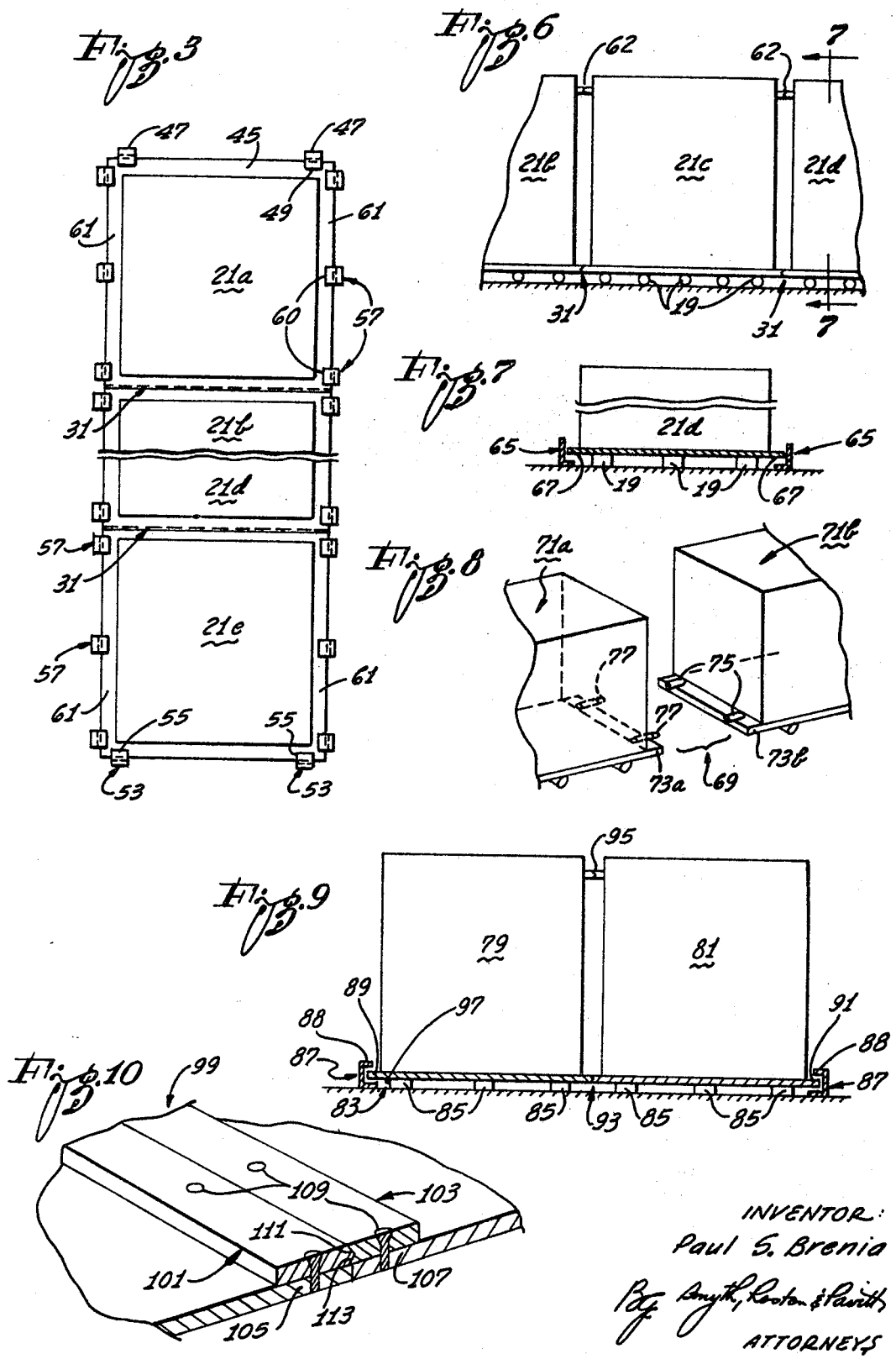

3,446,462
Patented May 27, 1969

3,446,462
CARGO CARRIER INTERLOCK SYSTEM
Paul S. Brenia, Torrance, Calif., assignor, by mesne assignments, to Tridair Industries, Redondo Beach, Calif.
Filed Apr. 14, 1967, Ser. No. 631,036
Int. Cl. B64d 9/00; B61d 45/00; B65j 1/24
U.S. Cl. 244—118       16 Claims

ABSTRACT OF THE DISCLOSURE

This disclosure describes a system for utilizing the several cargo carrying units within a cargo transporting vehicle such as an aircraft so that the several cargo carrying units will react structurally to dynamic forces substantially as a single unit. The cargo carrying unit may be a pallet, a container, etc. In the specific embodiment illustrated, this unitizing feature is acomplished by interlocking the adjacent cargo carrying units by interlocking means mounted directly on such units. The interlocking means disclosed are of the quick connect and quick disconnect type.

Background of the invention

It is common practice to palletize cargo or to place cargo within large containers for materials handling and transportation purposes. Pallets with retaining straps or containers used for such purposes are referred to herein as cargo containing units or cargo containerizing units.

Cargo carrying units are subjected to various dynamic loads or forces during transportation thereof by commercial vehicles. Aircraft in particular subject the cargo carrying unit to relatively severe axial, vertical, and side loads both in flight and upon landing. It is very important that the cargo carrying units be properly secured within the aircraft to prevent them from coming loose and moving violently within the aircraft to damage the aircraft, the cargo carried by the aircraft and personnel.

Accordingly, it has become conventional practice to fix the cargo carrying units securely within the aircraft. To this end, aircraft are provided with floor structures for supporting the cargo. The floor structure may have rollers to facilitate loading and unloading of the cargo carrying units. The cargo carrying units are arranged in a longitudinally extending row within the aircraft and, to hold these units against the various dynamic loads, the floor structure also includes many separate lock devices arranged to hook over or embrace the transverse edges of each of the units. These locks must be movably mounted to allow lowering of the locks when the units are moved thereover.

These locks are undesirable in that they add a considerable weight penalty to the aircraft and increase the cost of the cargo transporting system. The locks require some time to actuate, i.e. to move or pivot to the appropriate position during the loading and unloading of the cargo carrying units from the aircraft. In addition, the actuation of these locks is accomplished manually thereby introducing the possibility of operator error.

Some conventional air cargo transportation systems also utilize side guide members having a portion which overhangs the longitudinal edges of the cargo carrying units to restrain the cargo carrying units against side loads and against overturning movement as a result of the side loads. With present systems, each of the cargo carrying units must have at least one of the side guide members along the longitudinal edges thereof. To the extent that the overhang projects laterally into the interior of the cargo carrying compartment of the aircraft, the volume of the cargo carrying portion of the aircraft is reduced.

Summary of the invention

The present invention eliminates the lock devices heretofore used along the transverse edges of the cargo carrying units and therefore, the present invention reduces the weight penalty and the cost of the cargo transporting system. As the lock devices are eliminated, loading and unloading of the aircraft can be accomplished more rapidly. The present inventon also eliminates the need in some instances for the overhanging portions of the side guide members.

A basic concept of the present invention is unitizing of the several cargo carrying units within a transporting vehicle such as an aircraft so that the several units will react structurally to dynamic shear forces substantially as though it were a single rigid unit. Unitizing is preferably accomplished by interlocking means mounted on the units themselves and thus, there is no need for the lock devices used heretofore along the transverse edges of the several cargo carrying units.

The present invention teaches the use of forward and aft locks of sufficient strength to restrain the cargo carrying units against axial loads, i.e. forward and aft loads. It will be appreciated that with the units interlocked and with the lock devices eliminated, all of the forward and aft loads will be reacted by the forward and aft locks. Thus no lock is provided for directly connecting the cargo carrying units to the floor structure and only the forward and aft locks retain the units against axial movement. Likewise, with the cargo carrying units interlocked, it becomes impossible for the axially directed loads to overturn the entire elongated interconnected group of cargo carrying units.

The present invention also teaches use of means along the periphery of the unitized cargo carrying units for restraining them against upwardly directed forces. Such means may be incorporated into the forward and aft locks in the form of flanges overhanging the transverse edges of the forwardmost and rearwardmost units. With this arrangement, overturning due to side loads can also be prevented or substantially restrained by the forward and aft locks.

It is desirable to provide side guide members to retain the units against movement in response to side or laterally directed loads. The side guide members may be provided with flanges overhanging the longitudinal edges of the units to assist in retaining the units against upwardly directed forces.

The present invention provides interconnecting means that rigidly interconnects the adjacent cargo carrying units so that it reacts structurally as a single unit. However, if such interconnecting means is not completely rigid, forwardly directed loads may tend to pivot the cargo carrying units forwardly about the forwardmost supporting roller for that particular unit. That is, forward loads may tend to overturn each of the cargo carrying units individually. This overturning tendency tends to urge the forward end of each of the units downwardly and the aft end of each of the units upwardly. However, with the present invention, the forward end of each of the units is interconnected to the rear end of the unit immediately forwardly thereof. Thus, the tendency of the forward end of each unit to pivot downwardly is resisted by the tendency of each of the rear or aft ends of the units to move upwardly.

The tendency of the interconnected cargo carrying units to individually pivot can be eliminated entirely by utilizing upper and lower interconnecting means to interlock adjacent units. This can be accomplished, for example, by locating the lower connecting means adjacent the lower end of the unit and the upper connecting means adjacent the upper end of the unit so that the center of gravity of the unit, through which the dynamic forces are applied, will lie intermediate the two connectors. In addition, the use of side guide members with overhanging flanges embracing the longitudinal edges of the units will also prevent this overturning movement.

The interconnecting means may take many forms; however, it is desirable that the interconnecting means be quickly and automatically connectible and disconnectible to keep cargo loading and unloading time at a minimum. Further, the invention is applicable to interconnecting means add a minimum amount of weight to the aircraft. Although various types of connecting means may be used, a connector that includes a projection on one of the units and a corresponding coacting recess on the adjacent unit meets all of these requirements.

The concepts of this invention are applicable to any cargo carrying unit whether of the pallet or container type. Further, the invention is applicable to interconencting cargo carrying units along the longitudinal edges thereof whenever such units are transported in multiple longitudinally extending rows.

The invention, both as to its organization and method of operation together with further features and advantages thereof may best be understood by reference to the following description taken in connection with the accompanying drawings.

Brief description of the drawings

FIG. 1 is a diagrammatic side elevational view of a cargo carrying system constructed in accordance with the teachings of this invention.

FIG. 2 is an enlarged fragmentary sectional view of one form of means for interconnecting the adjacent cargo carrying units.

FIG. 3 is a fragmentary plan view of the present invention.

FIG. 4 is a diagrammatic rear elevational view taken along line 4—4 of FIG. 1.

FIG. 5 is a fragmentary diagrammatic view similar to FIG. 1 illustrating the overturning forces that are applied to the cargo carrying units.

FIG. 6 is a fragmentary view similar to FIG. 1 showing a second embodiment of the present invention.

FIG. 7 is a diagrammatic sectional view taken along line 7—7 of FIG. 6.

FIG. 8 is a fragmentary perspective view of another form of interlocking means.

FIG. 9 is a fragmentary transverse sectional view showing how the teachings of the present invention may be applied to a cargo carrying system having two longitudinally extending rows of cargo carrying units.

FIG. 10 is a perspective view partially in section of an alternate form of interlocking means.

Description of the specific embodiments

Referring to the drawings and in particular to FIG. 1 thereof, reference numeral 11 designates a cargo carrying system constructed in accordance with the teachings of this invention. The cargo carrying system 11 is located within a cargo carrying compartment 13 of a vehicle 15. Although the cargo carrying system 11 is particularly adapted for use in aircraft, it should be understood that it can be utilized in other vehicles.

The vehicle 15 has a supporting floor structure 17 which includes a plurality of rollers 19 for supporting a plurality of cargo carrying units 21a, 21b, 21c, 21d, and 21e. The rollers 19 can be mounted in any known manner to allow low friction longitudinal movement of the cargo carrying units 21 thereover.

In the embodiment shown in FIG. 1, the cargo carrying units 21 are arranged in a longitudinally extending row in the cargo compartment 13. Each of the units 21 includes a base member 23 having a lower surface 25 which rests on the rollers 19 and an upper surface 27 for supporting cargo thereon. The cargo which rests on the upper surface 27 is covered by a covering means 29. The base member 23 may constitute a pallet and the covering means 29 may be a net for securing the cargo to the base member 23 or a container such as the container commonly referred to as "igloos." Alternatively, the cover 29 may be a container and the base member 23 may constitute a floor for such container.

Interlocking, interconnecting or first connector means 31 are provided on the units 21 for unitizing the units 21 by interlocking the adjacent units together. Each of the interlocking means 31 may be identical and a typical interlocking means is shown in FIG. 2

As shown in FIG. 2, each of the units 21d and 21e have transverse edge portions 33 and 35, respectively, which extend longitudinally beyond the ends of their respective cover means 29. The edge portions 33 and 35 are considered transverse because they extend transversely of the floor structure. The transverse edge portions 33 and 35 form portions of the transverse sides of the units 21d and 21c and include edge members 37 and 39, respectively, which are preferably constructed of a strong metal. The edge members 37 and 39 extend the full transverse length of their respective cargo carrying units and the edge member 37 defines a groove or recess 41 which extends the full transverse length thereof and opens towards the cargo carrying unit 21e. Similarly, the edge member 39 forms a projection or tongue which projects longitudinally into the groove 41 and extends the full transverse length of the unit 21e. Although the interlocking means 31 may take various forms, the form shown in FIG. 2 has several advantages in that the lock is formed automatically upon moving two of the units 21 together and automatically releases upon pulling the units apart. Furthermore, the interlocking means 31 is formed integrally with the base member 31 and takes up little additional space. The interlocking means 31 interconnects the base members 23 of the adjacent cargo carrying units 21 and the units 21 are not individually restrained against axial movement. Thus, all of the units 21 react structurally to axial shear loads substantially as though all of the base members 23 were permanently interconnected to form a single cargo carrying platform.

The forwardmost pallet 21a has a forward transverse edge portion 45 (FIGS. 1 and 3). A pair of forward locks 47 are rigidly suitably affixed to the vehicle 15 and each lock 47 has a flange 49 overhanging the transverse edge portion 45. The forward lock 47 reacts or resists forwardly directed axial loads which act through the base members 23. In this connection, it should be noted that the forward locks 47 must be sufficiently strong to withstand the total forward force acting through all of the cargo carrying units 21 in that any forwardly directed shear force on the rearwardmost cargo carrying unit 21e will act through the intermediate units 21d, 21c, and 21b to the base member 23 of the unit 21a. Although one or more of the forward locks 47 may be provided along the transverse edge portion 45, as desired, it is preferred to use at least two of the locks. The overhanging flange 49 of the forward lock 47 resists forces which tend to move the units 21 upwardly.

Similarly, the rearwardmost unit 21e has an aft transverse edge portion 51 and a pair of aft locks 53 cooperate therewith to retain the units 21 against rearwardly directed loads and to assist the forward lock 47 in resisting upwardly directed loads. Each of the aft locks 53 has a flange 55 which overhangs the edge portion 51 to restrain the units 21 against upward loads. The aft locks 53, like the forward locks 47 must be sufficiently strong to withstand the rearward directed shear loads from all of the units 21 and, preferably two or more of the aft locks are disposed along the transverse edge portion 51.

The system 11 also includes a plurality of side guide members 57 (FIGS 3 and 4) securely mounted to the vehicle 15 and extending along longitudinal edges 59 of the units 21. In the embodiment shown in FIG. 3, each of the side guide members 57 has a flange portion 60 similar to the flanges 49 and 55 on the forward and aft locks. Thus, the side guide members 57 shown in FIGS. 3 and 4 overhang longitudinal edge portions 61 of the units 21 and are operative to restrain the units 21 against upward loads. Additionally each of the side guide members 57 forms an abutment which is engageable with the longitudinal edges 59 of the units 21 to resist side or lateral loads that may be applied to the units. Although any desired number of the side guide members 57 may be used and, the side guide members 57 may be spaced as desired, it is preferred to provide at least one one of the side guide members along each of the longitudinal edges 59 of each of the units 21.

In actual practice of the invention the interlocking means 31 may not provide a completely rigid connection between the adjacent cargo carrying units. That is, the interlocking means 31 may allow an overturning movement of each of the individual units 21 in response to axial forces acting thereon. FIG. 5 diagrammatically illustrates the effect of the use of interlocking means which does not completely rigidly interconnect adjacent units against this overturning effect.

The application of a forward dynamic load to the unit 21c acts through the center of gravity thereof and tends to pivot the unit 21c about a pivot point on the forwardmost roller 19 which supports the unit 21c. The forward end of the unit 21c tends to pivot downwardly and the aft end of the unit 21c tends to move upwardly as indicated by the arrows in FIG. 5. If this pivoting tendency were to go unchecked, damage to the cargo and to the aircraft could result. However, with the present invention the adjacent units 21b and 21d will similarly be subjected to the same or similar forward load and therefore be similarly tending to rotate about a corresponding pivot point on the forwardmost supporting roller therefor. Thus, the aft end of the unit 21b will tend to move upwardly and the forward end of the unit 21d will tend to move downwardly as shown by the arrows in FIG. 5. With the present invention, the tendency of the aft end of the unit 21c to pivot is at least partially offset by the units 21b and 21d which tend to pivot the unit 21c in the opposite direction. This offsetting effect occurs at each of the interlocking means 31 throughout the system 11. Of course, similar results are obtained when the force is directed in the aft direction.

The magnitude of the force on each of the units 21 depends upon various factors including the change of velocity of the vehicle 15 and the mass of the unit 21 including the cargo contained therein. Thus, if the mass of the units 21b and 21c were grossly unequal as where the unit 21c was loaded with heavy cargo and the unit 21b was empty, the dynamic force acting on the unit 21c would exceed that acting on the unit 21b. In this event, if the interlocking means 31 did not rigidly interconnect the units 21b and 21c, the relatively small counterrotational force applied on the unit 21c by the unit 21b may not be sufficient to offset the overturning movement of the unit 21c to the extent that is desired. In this event the overhanging flanges 60 of the side guide members 57 are operative to prevent individual overturning of the units 21.

FIG. 4 shows a side factor or side load acting through the center of gravity of the unit 21c. This side load also results in an overturning movement which, in the illustration shown in FIG. 4, tends to pivot the unit 21c about the pivot point illustrated in the direction indicated by the arrows. The flanges 60 of the side guide members 57 restrain the unit 21c against this overturning movement. In addition, as the units 21 are all interconnected, the forward locks 47 and aft locks 53 restrain the unitized cargo carrying units 21 from overturning laterally under the influence of side loads.

FIGS. 6 and 7 show an embodiment of the invention in which some of the overhanging flanges on the side guide members and/or the forward and aft locks can be eliminated. This can be accomplished by using a second interlocking or connector means 62 adjacent the upper ends of the units 21b and 21c for connecting these units together adjacent the upper ends thereof. The interlocking means 62 may be identical to the interlocking means 31 and therefore, can be a tongue-in-groove arrangement as shown in FIG. 2. Generally, the desired characteristics of the interlocking means 62 are the same as the desired characteristics of the interlocking means 31 in that both of them should be quickly and easily connectible and disconnectible from each other and add little weight to the vehicle 15. The effect of using both of the interlocking means 31 and 62 is that the overturning tendency of each of the units 21 is eliminated or made negligible. The overturning movement is completely eliminated if the interlocking means 61 is located axially aligned with the forwardly directed force which may be assumed to act through the center of gravity as shown in FIG. 5. Similarly, the overturning movement is also eliminated if the interlocking means 31 and 62 are vertically spaced and the forward force acts intermediate the two interlocking means. This is the preferred condition and is shown in FIG. 6. The interlocking means 62 preferably extends the full transverse width of the units 21 to which it is connected. Of course, suitable relatively rigid supporting means for the interlocking means must be provided. Such means may be formed on the cover means 29 if desired and/or mounted on the base member 23.

FIG. 7 shows side guide members 65 disposed along longitudinal edges 67 of the unit 21d. The side guide members have no overhanging flanges to restrain the edges 67 against upward movement. Thus, in this embodiment all of the uploads are reacted by the forward and aft locks.

FIG. 8 illustrates another embodiment of the present invention. FIG. 8 shows interlocking means 69 which rigidly interlock a pair of adjacent cargo carrying units 71a and 71b. The units 71a and 71b have confronting transverse edge portions 73a and 73b, respectively, on which the interlocking means 69 is mounted.

The interlocking means 69 includes a pair of strong tube members 75 and a cooperating pair of rigid projections 77 rigidly mounted on the edge portions 73b and 73a, respectively. The projections 77 are axially alignable with the tubes 75 and snugly receivable therein to rigidly interlock the units 71a and 71b together. The outer ends of the projections 77 may be tapered, if desired, to facilitate their insertion into the tubes 75.

As the interlocking means 69 rigidly interlocks the units 71a and 71b, individual overturning of the units 71a and 71b, as described hereinabove in connection with FIG. 5, is not possible. Thus, when the interlocking means 69 is employed, the cargo carrying units interlocked thereby react structurally as though it were a single unitary member. As the interlocking means 69 forms a completely rigid connection, the embodiment of FIG. 8 may utilize side guide members having no overhanging flanges such as the side guide members 65 shown in FIG. 7. In every other respect however the cargo carrying units and the supporting structure therefor, shown in FIG. 8, may be identical to the corresponding elements shown in FIG. 1.

FIG. 9 illustrates another embodiment of the invention in which the invention is made applicable to two longitudinally extending rows of cargo carrying units. The first of the rows includes a plurality of cargo carrying units 79 (only one being shown in FIG. 9) and the second of these rows includes a plurality of cargo carrying units 81 (only one being shown in FIG. 9). The cargo carrying units 79 and 81 except as specifically noted herein are identical to the cargo carrying units 21. The units 79 and 81 are suitably supported on a supporting floor structure 83 which preferably includes a plurality of rollers 85. A plurality of side guide members 87 are suitably secured to the floor structure 83 along outboard longitudinal edge portions 89 and 91 of the units 79 and 81, respectively. These side guide members 87 may be identical to the side guide members 57 shown in FIG. 4 in that they preferably have a flange portion 88 overhanging the longitudinal edge portions 89 and 91. Any suitable number of these side guide members 87 may be provided.

The units 79 have interlocking means (not shown) such as the interlocking means 31 (FIG. 2) for interconnecting the units 79 together. Similarly, each of the units 81 has interlocking means (not shown) such as the interlocking means 31 for interconnecting each of the units 81 together. In addition, the units 79 and 81 have interlocking means 93 and 95, each of which may be identical to the locking means 31 for interconnecting each of the units 79 to the adjacent unit 81. Each of the interlocking means 93 and 95 may include a longitudinally extending projection and a mating longitudinally extending recess with the projection and recess of the means 93 being formed along the inboard longitudinal edges of the units 79 and 81.

The units 79 and 81 are restrained against movement due to forward, aft, and upwardly directed loads in the same manner as described above in connection with FIG. 1. Similarly, the units 79 and 81 are restrained against side loads in the same manner as discussed above in connection with FIG. 4. In addition, as the transversely adjacent units 79 and 81 are interconnected along their inboard longitudinal edges, the tendency of the side loads to overturn both of the units 79 and 81 about a pivot point 97 is substantially reduced in that with the units 79 and 81 connected, the unit 81 offers a substantially increased resistance to overturning about the point 97. The tendency of the units 79 and 81 to overturn individually in response to side loads is decreased by use of the upper interlocking means 95.

FIG. 10 illustrates an alternate form of interconnecting means 99 which can be utilized in lieu of the interlocking means shown in the above described embodiments and which permits use of the present invention on existing cargo carrying units. The interlocking means 99 includes locking members or connectors 101 and 103 which are suitably mounted on edge portions 105 and 107, respectively, as by screws 109. The edge portions 105 and 107 may, for example, correspond with the transverse edge portions 33 and 35 shown in FIG. 2. The locking member 101 is formed with a generally V-shaped projection 111 and the locking member 103 is formed with a mating generally V-shaped groove or recess 113 both of which preferably extend for the full length of the edge portions 105 and 107. The projection 111 is receivable within the recess 113 as shown in FIG. 10 to securely interconnect the edge portions 105 and 107 of the adjacent units. Thus, the primary difference between the interlocking means 99 and the interlocking means 31 is in the cross sectional shape of the projection and recess and the interlocking means 99 is made up of separate members on the cargo carrying units rather than formed integrally with the edge portions of the units. Of course, the interlocking means 99 can be mounted in any suitable way and, interlocking means of various other types can be utilized.

Although an exemplary embodiment of the invention has been shown and described, many changes, modifications, and substitutions may be made by one having ordinary skill in the art without necessarily departing from the spirit and scope of this invention.

I claim:
1. In a cargo carrying system for use in a cargo carrying vehicle having a supporting floor structure, the combination of:
  a plurality of cargo carrying units adapted to be arranged in a row along the supporting floor structure and including a first unit and a second unit;
  first lock means mounted in said vehicle and engageable with the first unit for restraining said first unit against forces directed generally from said second unit toward said first unit;
  second lock means engageable with the second unit for restraining said second unit against forces directed generally from said first unit toward said second unit;
  means for unitizing said plurality of cargo carrying units to cause said first lock means to restrain all of said units against said first mentioned forces applied thereto and said second lock means to restrain all of said units against said second mentioned forces applied thereto;
  said unitizing means including locking means carried by an adjacent pair of said units for locking said pair of units together to at least substantially prevent elevation of one of said pair of units relative to the other of said pair of units whereby said locking means prevents individual overturning of each of said pair of units; and
  means for retaining said units against upward forces.

2. A combination as defined in claim 1 wherein each of said first and second lock means provides an at least substantially rigid abutment for resisting the forces applied to said units.

3. A combination as defined in claim 1 wherein said unitizing means includes means defining a projection on said one unit extending toward said other unit and a recess on said other unit extending toward said one unit, said recess and projection extending toward each other and being sized to interlock to thereby lock said first and second units together.

4. A combination as defined in claim 1 wherein said row extends generally longitudinally of the supporting floor structure and said first unit is positioned forwardly of said second unit.

5. A combination as defined in claim 1 wherein said locking means includes means for interlocking said pair of units together at least at two vertically spaced locations.

6. A combination as defined in claim 1 including first and second longitudinally extending rows of cargo carrying units on said supporting floor structure arranged in side-by-side relationship and said unitizing means includes means for interlocking each of said units to the longitudinally and transversely adjacent units.

7. In a cargo carrying system for use in a cargo compartment with a supporting floor structure the combination of:
  a plurality of cargo carrying units arranged longitudinally along said supporting floor structure and including a first unit and a second unit, each of said units having generally opposed sides with the adjacent sides of adjacent units being in generally confronting relationship;
  first lock means mounted in said cargo compartment and engageable with the first unit for retaining said first unit against forces extending in the direction from said second unit toward the first unit;
  second lock means mounted in the cargo compartment and engageable with the second unit for retaining said second unit against forces extending in the direction from said first unit toward said second unit;
  means on said units for interlocking each of said units to the adjacent units to cause the first lock means to retain said units against said first mentioned forces and the second lock means to retain said units against said second mentioned forces;
  said interlocking means including locking means carried by an adjacent pair of said unit engageable in response to the movement of said pair of units toward each other along the supporting floor structure to automatically lock said pair of units together; and
  means for retaining said units against upward movement relative to the supporting floor structure.

8. A combination as defined in claim 7 wherein said locking means permits movement of said pair of units away from each other along the supporting floor structure and is responsive to such movement to automatically unlock said pair of units.

9. In a cargo carrying system for use in a cargo carrying vehicle having a supporting floor structure in the combination of:
- a plurality of cargo carrying units adapted to be arranged in at least first and second longitudinally extending, side by side rows along the supporting floor structure, each of said rows of cargo carrying units including a forward unit and an aft unit, each of said units having generally opposed edges extending transversely of the supporting floor structure whereby the adjacent transverse edges of the adjacent units in each of said rows are confronting, each of said units having an outboard longitudinal edge and an inboard longitudinal edge confronting the inboard longitudinal edge of the adjacent unit of the adjacent row;
- forward lock means mountable in said vehicle engageable with the forward units of each of said rows for restraining said forward units against forwardly directed forces;
- aft lock means mountable within the vehicle and engageable with the aft units of each of said rows for restraining said aft units against rearwardly directed forces;
- each of said rows of cargo carrying units including means for unitizing the cargo carrying units therein to cause the forward lock means to restrain all of said units against forwardly directed forces applied thereto and said aft lock means to restrain all of said units against rearwardly directed forces applied thereto;
- first and second side guide means disposed respectively along the outboard longitudinal edge of said first and second row of cargo carrying units to retain said units against side loads;
- means for interlocking the units of the first row to the adjacent units of the second row to cause said first side guide means to restrain all of said units against side loads applied thereto in a first direction and said second guide means to restrain all of said units against side loads applied thereto in a second direction; and
- means for retaining said units against upward forces.

10. A cargo carrying unit for use in a cargo transporting vehicle having a supporting floor structure, said cargo carrying unit including:
- a base member having an upper surface for supporting cargo and a lower surface engageable with the supporting floor structure of the vehicle to support the unit and the cargo, said base member having a first pair of generally opposed edges;
- means on said base member adjacent one of said edges for defining a projection;
- surface means on said base member adjacent the other of said transverse edges for defining a recess sized and shaped to lockingly receive said projection, said recess opening away from said projection and said projection projecting longitudinally away from said recess whereby said projection and recess can mate with a recess and projection, respectively, of similar adjacent base members to thereby interlock said base member to the adjacent base members, said surface means including upper and lower surface means adapted to retain the projection of the adjacent base member against up and down movement; and
- means for retaining cargo on the upper surface of the base member.

11. A combination as defined in claim 10 including upright means extending upwardly from said base member and means mounted on said upright means above said recess and projection for lockingly connecting said base member to the adjacent base members.

12. A cargo carrying unit as defined in claim 10 wherein said first pair of edges extend transversely, said unit having a pair of longitudinal edges, one of said longitudinal edges of said base member has a transversely protruding projection extending therealong and the other of said longitudinal edges of said base member has a recess therein sized and shaped to lockingly receive said transversely protruding projection.

13. A cargo carrying unit as defined in claim 10 wherein said base member includes a pallet and said last mentioned means includes a container mounted on said pallet.

14. A cargo carrying unit as defined in claim 10 wherein said recess extends for a substantial distance along said other edge and said projection defines a tongue extending for a substantial distance along said one edge.

15. A cargo carrying unit for use in a cargo transporting vehicle having a supporting floor structure and connectible to an adjacent cargo carrying unit, said cargo carrying unit including:
- a base member having an upper surface for supporting cargo and a lower surface engageable with the floor structure of the vehicle to support the unit and the cargo, said cargo carrying unit having forward and aft transverse edges;
- first relatively rigid means extending upwardly from said base member adjacent one of the forward and aft transverse edges thereof;
- first connector means mounted on one of said base members and said first rigid means adjacent said one edge and the lower end of the cargo carrying unit for interconnecting said cargo carrying unit to an adjacent cargo carrying unit; and
- second connector means mounted on said first relatively rigid means above said first connector means for interconnecting the cargo carrying unit to the adjacent cargo carrying unit whereby the cargo carrying unit can be connected to the adjacent unit at vertically spaced locations.

16. In a cargo carrying system, the combination of:
- an aircraft having a cargo compartment with a supporting floor structure;
- a plurality of cargo carrying units arranged longitudinally along said supporting floor structure and including a forward unit and an aft unit, each of said units having generally opposed sides extending transversely of said supporting floor structure whereby the adjacent transverse sides of adjacent units are confronting;
- forward lock means mounted in said cargo compartment and engageable with the forward transverse side of said forward unit for retaining said forward unit against forward movement;
- aft lock means mounted in the cargo compartment and engageable with the rearward transverse side of said aft unit for retaining said aft unit against rearward movement;
- means on said units for interlocking each of said units to the adjacent units to cause the forward lock means to retain all of said units against forward movement relative thereto and aft lock means to retain all of said units against rearward movement relative thereto;
- means for retaining said units against upward movement relative to the supporting floor structure; and
- said interlocking means including a groove formed in one of said transverse sides of one of said units and extending transversely therealong and a coacting tongue on the confronting transverse side of the adjacent unit sized to be received within said groove to interlock said one unit with the adjacent unit.

(References on following page)

References Cited

UNITED STATES PATENTS

| | | | |
|---|---|---|---|
| 2,137,255 | 11/1938 | Tuttle | 105—366 |
| 2,191,222 | 2/1940 | Sheehan | 105—366 |
| 2,538,531 | 1/1951 | Likens | 105—366 |
| 2,858,774 | 11/1958 | Batten | 244—137 |
| 3,251,489 | 5/1966 | Davidson | 244—137 |

MILTON BUCHLER, *Primary Examiner.*

THOMAS W. BUCKMAN, *Assistant Examiner.*

U.S. Cl. X.R.

105—375, 366